United States Patent
Yan et al.

(10) Patent No.: US 6,395,331 B1
(45) Date of Patent: May 28, 2002

(54) TRANSPARENT SUBSTRATE BEARING AN ANTI-STAIN, HYDROPHOBIC COATING, AND PROCESS FOR MAKING IT

(75) Inventors: Yongan Yan, Thousand Oaks; Din-Guo Chen, Agoura, both of CA (US)

(73) Assignee: Yazaki Corporation (JP)

( * ) Notice: Subject to any disclaimer, the term of this patent is extended or adjusted under 35 U.S.C. 154(b) by 0 days.

(21) Appl. No.: 09/529,392

(22) PCT Filed: Oct. 14, 1998

(86) PCT No.: PCT/US98/21797
§ 371 (c)(1),
(2), (4) Date: Apr. 10, 2000

(87) PCT Pub. No.: WO99/19084
PCT Pub. Date: Apr. 22, 1999

Related U.S. Application Data

(60) Provisional application No. 60/063,349, filed on Oct. 28, 1997.

(51) Int. Cl.[7] .............................. B05D 3/02; B05D 5/06; B32B 9/00; B32B 9/04; B32B 13/12; B32B 17/06
(52) U.S. Cl. ....................... 427/169; 427/379; 427/387; 427/389.7; 427/393.5; 428/429; 428/447; 428/451
(58) Field of Search ................................. 427/164, 165, 427/169, 379, 387, 389.7, 393.5; 428/429, 447, 451

(56) References Cited

U.S. PATENT DOCUMENTS

| | | | |
|---|---|---|---|
| 4,778,721 A | * 10/1988 | Sliemers et al. | 428/336 |
| 4,895,767 A | * 1/1990 | Mori et al. | 428/447 |
| 5,071,709 A | 12/1991 | Berquier et al. | 428/447 |
| 5,368,892 A | 11/1994 | Berquier | 427/299 |
| 5,679,458 A | * 10/1997 | Cho et al. | 428/412 |
| 5,846,649 A | * 12/1998 | Knapp et al. | 428/334 |
| 6,177,582 B1 | * 1/2001 | Jenker et al. | 556/425 |

FOREIGN PATENT DOCUMENTS

| | | | |
|---|---|---|---|
| EP | 166363 A2 | * | 1/1986 |
| JP | 10-151421 A2 | * | 6/1998 |
| JP | 2000-219875 A2 | * | 8/2000 |
| WO | WO-9840323 A1 | * | 9/1998 |
| WO | WO-2000063129 A1 | * | 10/2000 |

OTHER PUBLICATIONS

Ogasawara et al, Colloid Polym. Sci. 278(10), pp 946–953, 2000.*
Iler, Ralph K., "The Chemistry of Silica," *Wiley–Interscience Publication*, 1979, pp. 660–663.
Seto, J., Nagai, T., Ishimoto, C., Watanabe, H., "Frictional Properties of Magnetic Media Coated with Langmuir––Blodgett Films," *Thin Solid Films*, 1985, One page Abstract.
Tada, H. and Nagayama, H., "Chemical Vapor Surface Modification of Porous Glass with Fluoroalkyl–Functional Silanes. 1. Characterization of the Molecular Layer," *Langmuir*, 1994, vol. 10, pp. 1472–1476.
Ulman, Abraham, "Wetting Studies of Molecularly Engineered Surfaces," *Thin Solid Films*, 1996, pp. 48–53.

* cited by examiner

*Primary Examiner*—Erma Cameron
(74) *Attorney, Agent, or Firm*—Sheppard, Mullin, Richter & Hampton LLP; James R. Brueggemann

(57) ABSTRACT

A process is described for applying a thin-film, hydrophobic, oil-repellant, stain-resistant, optical coating to a transparent substrate. The coating is applied using a treatment solution that incorporates an organosilane in a solvent of water, alcohol, and ethylene glycol or glycerol, and an acid catalyst, with the organosilane having a preferred concentration in the range of 0.05 to 50 mmole per liter. The treatment solution preferably is prepared in a two-step procedure, in which the organosilane is first reacted in concentrated form and then diluted. After the treatment solution has been applied to the transparent substrate, e.g., by dip coating, the coated substrate is dried, preferably by flash-drying at room temperature and then heating it to a prescribed elevated temperature, in a prescribed humidity.

27 Claims, 2 Drawing Sheets

Demonstration of Hydrophobicity of AR Surface: Non-wetting of ink (Sharpie® permanent marker).

As prepared AR surface : Hydrophobically treated

Demonstration of Hydrophobicity of AR Surface: Non-wetting of ink (Sharpie® permanent marker).

As prepared AR surface : Hydrophobically treated

TRANSPARENT SUBSTRATE BEARING AN ANTI-STAIN, HYDROPHOBIC COATING, AND PROCESS FOR MAKING IT

This application is a 371 of PCT/US98/21797, filed Oct. 14, 1998, which claims benefit to U.S. provisional application Ser. No. 60/063,349, filed Oct. 28, 1997.

BACKGROUND OF THE INVENTION

This invention relates generally to thin-film optical coatings and to processes for applying such coatings, and, more particularly, to processes for applying thin-film optical coatings that are hydrophobic and stain-resistant.

Many optical transparencies incorporate coatings made by stacking multiple thin-film layers having precise thicknesses and refractive indices. Generally, when such coatings are derived from inorganic materials, their exposed surfaces are inherently hydrophilic and have a high surface energy. Consequently, foreign contaminants in the form of dirt, oils and fingerprints can adhere strongly to such exposed surfaces.

Such foreign contaminants can severely degrade the optical performance of such coatings by altering the path of impinging light. In addition, the adhesion of such foreign contaminants can be very strong, such that they are removable only by applying various chemical cleaners or by physical wiping. However, such cleaning processes can permanently damage the coatings and/or the underlying substrates.

One prior technique for reducing the surface energy of such inorganic coatings is to thermally treat the coated substrates at temperatures in the range of 400 to 800° C., so as to dehydroxylate the surfaces' —OH groups. This technique generally is inadequate to treat surfaces already exposed to the ambient environment, and it cannot be used to treat coatings applied to substrates formed of plastic, because plastic substrates typically have deformation temperatures lower than the treatment temperature.

Another prior technique for reducing the surface energy of such inorganic coatings includes modifying the surface using a chemical vapor deposition process. Unfortunately, this technique requires the use of relatively expensive vacuum equipment and it requires relatively long time durations for the reaction and for evacuation of chemicals from the chamber.

Yet another prior technique for reducing the surface energy of such inorganic coatings is to deposit onto the optical coating a hydrophobic overcoat containing saturated hydrocarbon, fluorocarbon or organosilane. Organosilane-based solutions ordinarily incorporate non-polar or less polar solvents, such as octane, heptane, toluene, tetrahydrofuran and trichloroethane, which are either highly flammable or toxic. The use of such solvents, therefore, is undesirable. Known techniques for grafting organosilane coatings to underlying coated substrates also require relatively long soaking times under dry atmosphere (dry nitrogen or dry air), followed by rinsing or wiping with solvents and baking at elevated temperatures. Applying the coatings in a higher humidity environment can deteriorate the coating solution and/or cause the coating to be non-uniform or translucent.

In addition, organosilane coatings typically have optical indices very similar to that of glass, such that when such coatings are applied to glass substrates, the coatings might not be readily visible. However, any slight variation in the coating's thickness can adversely affect the optical performance of many optical substrates with multi-layer thin film coatings and can render surface contamination and defects highly visible.

It should, therefore, be appreciated that there is a need for a process for applying a low-cost, efficient, thin-film optical coating to a transparent substrate, wherein the coating is hydrophobic, oil-repellant, and stain-resistant, and wherein the coating does not adversely affect desirable optical properties of any underlying coating and/or the substrate. The hydrophobic coating also should be chemically stable, i.e., non-reactive with various solvents and detergents, and it should be mechanically and environmentally stable, i.e., resistant to variations in temperature, humidity and ultraviolet light. In addition, the hydrophobic coating should be uniform, with no pin-hole or spot defects, and its use should not be limited to any particular substrate size. Further, the coating should be applied by a simple dip-coating procedure without the need for toxic or highly flammable solvents, and it should be environmentally friendly and should not require the need for wiping or rinsing during the application process. The present invention satisfies these needs and provides further related benefits.

SUMMARY OF THE INVENTION

The present invention is embodied in a transparent substrate carrying a thin-film optical coating, and in a process for applying it, wherein the coating is hydrophobic, oil-repellant, and stain-resistant, and wherein the coating does not adversely affect desirable optical properties of any underlying coating and/or the substrate. The hydrophobic coating is chemically stable, i.e., non-reactive with various solvents and detergents, and it is mechanically and environmentally stable, i.e., resistant to variations in temperature, humidity and ultraviolet light. In addition, the hydrophobic coating is uniform, with no pin-hole or spot defects, and its use is not limited to any particular substrate size. Further, the coating is applied without the need for toxic or highly flammable solvents, and it is environmentally friendly and does not require the need for wiping or rinsing during the application process.

More particularly, the hydrophobic, oil-repellant, and stain-resistant thin-film coating is prepared by dip-coating a substrate in a treatment solution incorporating an organosilane in a solvent that includes water, an alcohol such as ethanol, propanol or butanol, ethylene glycol or glycerol, and an acid catalyst. The organosilane preferably has a concentration in the range of 0.05 to 50 mmole per 1000 ml of solution, and the solvent includes 0.1 to 90% by weight water, and 0.5 to 20% by weight ethylene glycol and/or glycerol, with the remainder being an alcohol, preferably ethanol or propanol, alone or mixed with butanol. The treatment solution preferably is prepared in a two-step procedure, in which the organosilane is first reacted in concentrated form and then diluted.

The organosilanes incorporated into the treatment solution have a saturated or fluorinated hydrocarbon chain, which will directly attach to silicon atoms in the underlying substrate by C-Si bonds. The organosilanes also contain 1 to 3 hydrolyzable groups, which directly bond to silicon atoms by C—O—Si bonds. The organosilanes can be described by the following general formula:

$$(RO)_{3-n}-Si-\{[C_{p+q}H_{2p}F_{2q}]-(CH_3 \text{ or } -CF_3)\}_{1+n}$$

where:

n is 0–3, p+q≧2 and preferably >8, and

R is an alkyl group, preferably $CH_3$— or $CH_3CH_2$—.

The acid catalyst incorporated into the treatment solution is a mineral or organic acid, preferably $CH_3CO_2H$, HCl or $HNO_3$.

The dip-coating procedure requires the substrates to be immersed in the treatment solution for just one to 60 seconds and to be withdrawn at a rate higher than about 0.001 cm/sec. Any size substrates can be accommodated, and multiple substrates can be dip-coated at a time, with the restriction that the substrates be spaced at least 1 cm apart. The relative humidity during the dip-coating procedure should be in the range of 15 to 95%, and preferably in the range of 40 to 80%. The temperature should be in the range of 10 to 40° C. The dip-coated substrates are flash-dried at room temperature for at least one minute, and preferably 20 minutes, and then baked at a temperature in the range of 50 to 250° C. for at least one minute.

The surfaces of the substrates to be coated in accordance with the invention should contain metallic or inorganic components, including by way of example, $SiO_2$, $Al_2O_3$, $ZnO_2$, $TiO_2$, ITO, $In_2O_3$, $Sb_2$, $O_3$, $MgF_2$, and $SnO_2$. These surfaces can be formed by bulk material, by coatings of such components on an underlying substrate, or by organic/inorganic composites containing such inorganic components.

Other features and advantages of the present invention should become apparent from the following description of the preferred embodiments and processes, taken in conjunction with the accompanying drawings, which illustrate, by way of example, the principles of the invention.

DESCRIPTION OF THE PREFERRED PROCESSES

Figure 1:
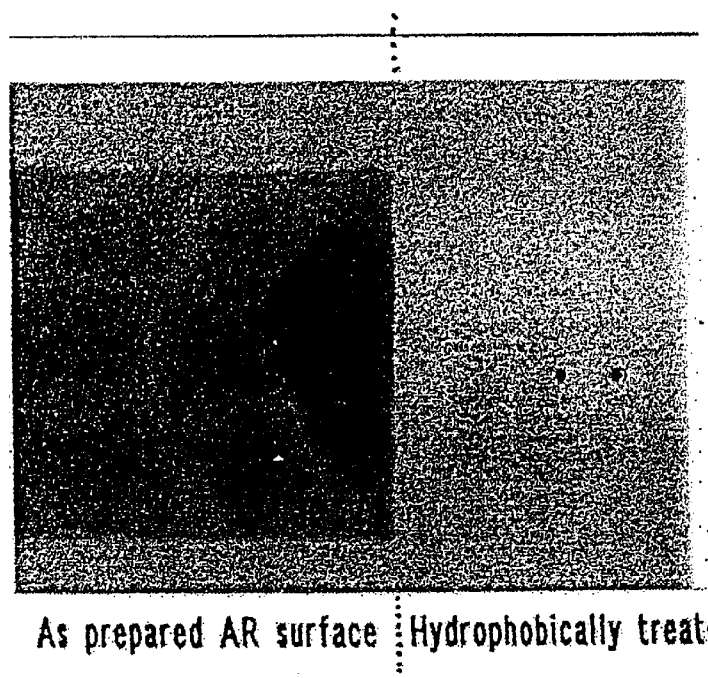
FIG. 1 depicts the effect of the application of a permanent marker to a transparent substrate carrying an inorganic, multi-layer, antireflective coating, with its left side untreated and its right side treated with a hydrophobic overcoat in accordance with the invention.

The preferred embodiments of the invention take the form of a transparent plastic substrate that carries an inorganic, multi-layer anti-reflective coating on which is deposited a special hydrophobic overcoat that substantially reduces the coated substrate's susceptibility to staining. In addition, the overcoat is applied in an efficient manner, without the need for highly flammable or toxic solutions and without the need for long processing time periods. Specifically, the hydrophobic overcoat is applied by dip-coating the substrate into an aqueous-alcohol solution containing a fluorinated organosilane, and by then drying and baking the coated substrate at a prescribed temperature and for a prescribed time period.

The solvent used in the fluorinated organosilane solution includes water and an alcohol such as ethanol, propanol or butanol. Optionally, the solvent can further include organic solvents having higher boiling points than those of the alcohol, such as ethylene glycol and glycerol. These solvent components all are less flammable and have lower toxicity than solvents used in known prior art methods of applying similar hydrophobic coatings.

The organosilanes used in the preferred embodiments of the invention incorporate saturated hydrocarbon chains that attach directly to metal atoms by C—O-metal bonds. The carbon chains, which may be branched, include at least two, and preferably eight or more, carbon atoms. Hydrogen atoms attached to the carbon atoms may be substituted by fluorine atoms, such as perfluorinated or fluorinated carbon chains. The organosilanes also preferably include one to three hydrolyzable groups that bond directly to metal atom by C—O-metal bonds. The organosilanes can be described by the general formula:

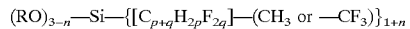

where:

n is 0–3, p+q≧2 and preferably >8, and

R is an alkyl group, preferably $CH_3$— or $CH_3CH_2$—.

The treatment solution also may contain suitable acidic catalysts such as $CH_3CO_2H$, HCl or $HNO_3$.

The concentration of the organosilane in the treatment solution is in the range of 0.05 to 50 mmole per 1000 ml of solution, and preferably in the range of 0.1 to 10 mmole per 1000 ml. The solvent includes 0.1 to 90% by weight water, and 0.5 to 20% by weight ethylene glycol and/or glycerol. The remainder of the solvent is alcohol, preferably ethanol or propanol, alone or mixed with butanol.

The composition of the treatment solution, and the process for preparing it, have a significant effect on the properties of the resulting coating. For example, depending on the particulars of the process for preparing the treatment solution and on the process for applying it, treatment solutions containing the same organosilane, or even the same treatment solution, can be used to produce dip-coated substrates having anti-contaminant, hydrophobic properties that are improved, that are unchanged, or that are severely, or permanently contaminated (e.g., translucent or incorporating non-removable stains).

The anti-contaminant, hydrophobic coating of the invention is suitable for application to substrates containing metallic or inorganic components, including by way of example $SiO_2$, $Al_2O_3$, $ZnO_2$, $TiO_2$, ITO, $In_2O_3$, $Sb_2$, $O_3$, $MgF_2$, and $SnO_2$. The substrates can be made of bulk material, such as glass sheet or aluminum foil, or they can themselves be coatings of inorganic components formed on any suitable substrate. The substrates preferably, but not necessarily, are cleaned and free of surface contamination before the anti-contaminant, hydrophobic coatings are applied.

Other features of the invention should become apparent from the following descriptions of illustrative, non-limiting examples. These examples illustrate various features and advantages of the invention.

EXAMPLE 1

A treatment solution was prepared in a two-step procedure. First, a solution A was prepared by mixing iso-propanol, water, HCl, and 1H,1H,2H,2H-perfluorodecyltriethoxysilane, in a molar ratio of 1300:11:290:1, for two hours under magnetic stirring. This solution A was then mixed with a solution B containing 56000 parts water (molar ratio), 1500 parts ethylene glycol, and 15000 parts iso-propanol, for one hour under magnetic stirring, to produce the treatment solution.

Polymethyl methacrylate (PMMA) substrates (40 cm×15 cm) carrying inorganic, multi-layer anti-reflective (AR) coatings then were contacted with the treatment solution for 10 seconds and withdrawn from the solution at a rate of 0.15 cm/sec, in a relative humidity of 50%. The substrates then were flashed in open air for 20 minutes and baked at 84° C. for 20 additional minutes. The water contact angle for the coated substrate was determined to be 55° before the treatment, and 118° after the treatment. The larger contact angle demonstrates a higher degree of hydrophobicity. Visible defects in the treated substrates were not observed, nor were shifts in the treated substrates' optical performance, in the spectral region of 400 to 700 nm.

Figure 2:
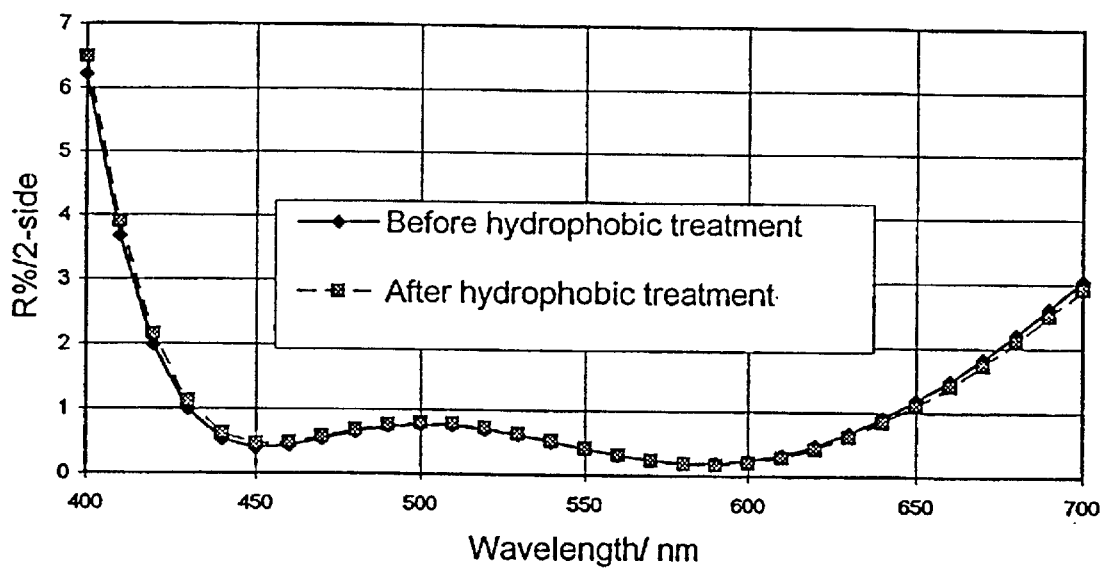
FIG. 2 is a graph depicting the reflectance of a transparent substrate carrying an inorganic, multi-layer, antireflective coating, both with and without a hydrophobic overcoat in accordance with the invention.

The improved stain-resistance for the treated substrate produced in Example 1 is depicted in FIG. 1, and the non-degradation of treated substrate's optical performance, as shown by reflectivity over the spectral region of 400 to 700 nm, is depicted in FIG. 2.

EXAMPLE 2

A treatment solution was prepared in exactly the same way as was done in Example 1, except that the reaction time for preparing solution A was reduced to 30 minutes. AR-coated PMMA substrates were contacted with the treatment solution for 10 seconds and then withdrawn at a rate of 0.15 cm/sec, in a relative humidity of 50%. The substrates then were baked at 84° C. for 20 minutes. The water contact angle was determined to have increased from 55° before the treatment to just 70° after the treatment. No visible defects were observed on the treated substrate. This Example shows that the reaction time for preparing solution A was insufficient.

EXAMPLE 3

A treatment solution was prepared by first preparing a solution A by mixing iso-propanol, water, HCl, and 1H,1H,2H,2H-perfluorodecyltriethoxysilane, in a molar ratio of 1000:3:1:1, for 30 minutes under magnetic stirring. Solution A was then mixed with an additional 5500 parts (molar ratio) of iso-propanol, for 15 hours under magnetic stirring. AR-coated PMMA substrates were contacted with the treatment solution for 20 minutes and then withdrawn at a rate of 0.3 cm/sec, in a relative humidity of 50%. The substrates then were baked at 84° C. for 20 minutes. The water contact angle was determined to have increased from 55° before the treatment to 116° after the treatment.

Many visible defects and contaminants were observed on the treated substrates. This is believed to have resulted from the presence of a non-uniform, aggregated organosilane layer on the substrate. It suggests that the particular solvents used, and not the particular organosilane, are an important parameter. The defects and contaminants on the treated substrates are partially removable by rinsing in iso-propanol and wiping with a cotton cloth. However, if this rinsing occurs prior to baking, organosilane molecules are prevented from bonding to the substrate, and the water contact angle will remain constant at 55° after the treatment.

EXAMPLE 4

A treatment solution was prepared by first preparing a solution A by mixing iso-propanol, water, HCl, and 1H,1H,2H,2H-perfluorodecyltriethoxysilane, in a molar ratio of 1800:74:2.3:1, for six hours under magnetic stirring. Solution A was then mixed with an additional 23000 parts (molar ratio) of water, for 30 minutes under magnetic stirring.

AR-coated PMMA substrates were contacted with the treatment solution for 10 seconds and then withdrawn at a rate of 0.2 cm/sec, in a relative humidity of 50%. The substrates then were baked at 84° C. for 20 minutes, without a preliminary flash-drying in open air. The water contact angle was determined to have increased from 55° before the treatment to 112° after the treatment. No visible defects were observed on the treated substrates. However, the treatment solution's useful lifetime was determined to be only about 30 hours. Substrates treated with the treatment solution three days after the treatment solution had been prepared failed to show any significant increase in water contact angle. This indicates that the particular solvents used are important in determining the treatment solution's useful life time.

EXAMPLE 5

A treatment solution was prepared in exactly the same way as was done in Example 1, and AR-coated PMMA substrates were dip-coated in the treatment solution in exactly the same way as was done in Example 1. A first set of the dip-coated substrates were flashed in open air for 20 minutes and then baked at 40° C. for 10 minutes. The water contact angle for this first set of substrates was determined to have increased from 55° before the treatment to 86° after the treatment. A second set of the dip-coated substrates were directly baked at 84° C. for 20 minutes, without being preliminarily flashed in open air. The water contact angles for this second set of substrates was determined to have increased from 55° before the treatment to 95° to 120° after the treatment. Many visible spot defects and organosilane contaminants were strongly attached to both sets of treated substrates. This Example shows that the curing conditions were inadequate, i.e., either the baking temperature was insufficiently high or the flashing in open air was omitted.

EXAMPLE 6

A treatment solution and AR-coated PMMA substrates were prepared in exactly the same manner as was done in Example 1, except that the relative humidity during the withdrawal of the substrates from the treatment solution was reduced to 10%. The water contact angle for these treated substrates was determined to have increased from 55° before the treatment to 95°–120° after the treatment. Many visible spot defects and organosilane contaminants were strongly attached to the substrates. This Example shows that relative humidity during the withdrawal of the substrates from the treatment solution affects the quality of the resulting coating.

EXAMPLE 7

Three treatment solutions were prepared in exactly the same manner as was done in Example 1, except that 1H,1H,2H,2H-perfluorodecyltrichlorosilane, octadecyltrichlorosilane, and octadecyltriethoxysilane were substituted for 1H,1H,2H,2H-perfluorodecyltriethoxysilane. AR-coated PMMA substrates then were dip-coated in exactly the same manner as was done in Example 1. The water contact angles for those treated substrates were determined to have increased from 55° before the treatment to 100°–120° after the treatment. This Example shows that the invention has utility using a variety of organosilane compositions.

EXAMPLE 8

A treatment solution and AR-coated PMMA substrates were prepared in exactly the same manner as were done in Example 1, except that the treatment solution was aged at room temperature for 60 days. Substrates treated with the aged solution were determined to have substantially the same properties as substrates treated with fresh solution. This Example shows that aging of the preferred treatment solution does not adversely affect the solution's utility.

EXAMPLE 9

AR-coated PMMA substrates treated in the manner set forth in Example 1 underwent: 1) a thermal shock test (−30 to 80° C., 1000 cycles), 2) a dry cotton abrasion test (500 g weight, 1000 times), 3) an ultraviolet radiation test (carbon arc, 450 hr), 4) a humidity test (60° C., 95% relative humidity, 192 hours), 5) and a chemical resistance test (gasoline, detergent, 60° C., 24 hours). No significant changes in the tested substrates' anti-contaminant and hydrophobic properties were determined to have occurred.

EXAMPLE 10

A pair of AR-coated eyeglasses were dip-coated in a treatment solution like that prepared in Example 1 and then were allowed to dry overnight (15 hours) at room temperature. The treated eyeglasses were determined to be more resistant to fingerprint and dirt contamination. The frequency of the need to clean the treated eyeglasses was reduced by 400 to 1000%. In addition, the treated eyeglasses were determined to be more easily cleaned than were the untreated eyeglasses.

EXAMPLE 11

An AR-coated PMMA substrate (40 cm×35 cm) was dip-coated in a treatment solution prepare in the same manner as set forth in Example 1. About 95% of the substrate's surface was determined to have an initial water contact angle of 65°, and the substrate surface's remaining 5% was determined to have an initial water contact angle of 77°. Contamination of this latter surface portion was believed to be the cause of this variation in water contact angle. After dip-coating and baking the coated substrate in the same manner as set forth in Example 1, the water contact angle was determined to have increased to 115–120° for the area whose original angle was 65°, but was determined to have remain substantially unchanged for the area whose original angle was 77°.

A new treatment solution was prepared in the same manner as was done in Example 1, except that the amount of solution A was increased relative to the amount of solution B by 25%. Thus, the same amount of solution A as in Example 1 was added to a new solution B containing 44800 parts water (molar ratio), 1200 parts ethylene glycol, and 12000 parts iso-propanol. After treating the substrate using the same procedure as described in Example 1, a uniform anti-stain, hydrophobic coating was achieved on the substrate's entire surface, and the water contact angle was determined to be 115–120° for the entire surface. This Example shows that increasing the concentration of the organosilane in the treatment solution can overcome the adverse effects of contamination in the underlying AR coating.

EXAMPLE 12

After a treatment solution prepared as set forth in Example 1 has been used extensively and/or aged for an extended period, it might yield coatings having a discernable decrease in water contact angle. Such an old treatment solution can be restored to original effectiveness by adding to it 30% more of the solution A, after it has been preliminarily reacted for two hours, and by mixing the replenished solution for longer than 10 minutes. Such a replenished solution produced uniform anti-stain, hydrophobic coatings over the entire surface of an AR-coated PMMA substrate. This Example shows that the treatment solution can be replenished without discarding the old solvents and without producing any waste solutions.

Although the invention has been described in detail with reference only to the presently preferred embodiments and processes, those of ordinary skill in the art will appreciate that various modifications can be made without departing from the invention.

We claim:

1. A process for applying an anti-stain, hydrophobic optical coating to a transparent substrate, comprising the steps of:

preparing a first solution consisting essentially of organosilane, alcohol, water, and an acidic catalyst, wherein the organosilane is described by the following formula:

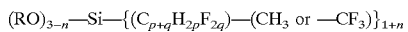

wherein:

n is 0–3, p+q≧2, and

R is an alkyl group;

allowing the first solution to react;

mixing the first solution with a second solution that comprises water, to produce a treatment solution;

applying the treatment solution to a surface of a transparent substrate; and drying the coated substrate.

2. A process as defined in claim 1, wherein:

p+q>8; and

R is $CH_3$— or $CH_3CH_2$—.

3. A process as defined in claim 1, wherein the organosilane incorporated into the first solution is 1H,1H,2H,2H-perfluorodecyltriethoxysilane.

4. A process as defined in claim 1, wherein the organosilane incorporated into the first solution is selected from the group consisting of 1H,1H,2H,2H-perfluorodecyltriethoxysilane, 1H,1H,2H,2H-perfluorodecyltrichlorosilane, octadecyltriethoxysilane, octadecyltrichlorosilane, and mixtures thereof.

5. A process as defined in claim 1, wherein the treatment solution comprises:

organosilane having a concentration in the range of about 0.05 to 50 mmole per liter;

a first solvent of water, having a weight concentration in the range of about 0.1 to 90%;

a second solvent selected from the group consisting of ethylene glycol, glycerol, and mixtures thereof, having a weight concentration in the range of about 0.5 to 20%; and a third solvent selected from the group consisting of ethanol, propanol, butanol, and mixtures thereof.

6. A process as defined in claim 5, wherein the treatment solution comprises organosilane having a concentration in the range of about 0.1 to 10 mmole per liter.

7. A process as defined in claim 1, wherein:

the first solution comprises 1H,1H,2H,2H-perfluorodecyltriethoxysilane, iso-propanol, water, and an acidic catalyst, in relative molar proportions of about 1:1300:11:290; and the second solution comprises water, ethylene glycol, and iso-propanol, in relative molar proportions of about 56000:1500:15000.

8. A process as defined in claim 1, wherein the step of allowing the first solution to react has a time duration of at least about two hours.

9. A process as defined in claim 1, wherein the step of applying comprises a step of dipping the substrate into the treatment solution and raising the substrate out of the treatment solution.

10. A process as defined in claim 9, wherein the step of raising the substrate out of the treatment solution occurs at a rate of higher than about 0.001 centimeters per second.

11. A process as defined in claim 1, wherein the step of drying the coated substrate comprises:
    initially drying the coated substrate in air for a first time period; and
    subsequently drying the coated substrate at an elevated temperature for a second time period.

12. A process as defined in claim 11, wherein:
    the step of initially drying the coated substrate has a duration of at least about 20 minutes; and
    the step of subsequently drying the coated substrate has a duration of at least about 20 minutes.

13. A process as defined in claim 11, wherein:
    the step of initially drying the coated substrate occurs at a temperature in the range of about 10 to 40° C.; and
    the step of subsequently drying the coated substrate occurs at a temperature in the range of about 50 to 250° C.

14. A process as defined in claim 11, wherein the step of subsequently drying the coated substrate occurs in an environment having a humidity in the range of 15 to 95%.

15. A process as defined in claim 14, wherein the step of subsequently drying the coated substrate occurs in an environment having a humidity in the range of 40 to 80%.

16. A process as defined in claim 1, and further comprising a step of aging the treatment solution for a plurality of days prior to use in the step of applying.

17. A process as defined in claim 16, and further comprising a step of adding an additional amount of the first solution to the treatment solution after the step of aging.

18. A process as defined in claim 1, wherein the substrate used in the step of applying comprises a material having metallic or inorganic components.

19. A process as defined in claim 18, wherein the substrate used in the step of applying comprises a polymethyl methacrylate substrate bearing an inorganic antireflection coating.

20. A process for applying an anti-stain, hydrophobic optical coating to a transparent substrate, comprising the steps of:
    mixing a first solution consisting essentially of an organosilane described by the following formula:

$(RO)_{3-n}-Si-\{(C_{p+q}H_{2p}F_{2q})-(CH_3 \text{ or } -CF_3)\}_{1+n}$ wherein:
    n is 0–3,
    p+q≧2, and
    R is an alkyl group, alcohol, water, and an acidic catalyst;
    allowing the first solution to react for a time period of at least two hours;
    mixing a second solution consisting essentially of solvents selected from the group consisting of water, ethylene glycol, glycerol, ethanol, propanol, butanol, and mixtures thereof;
    mixing the first solution with the second solution, to produce a treatment solution;
    dip-coating the treatment solution onto a surface of a transparent substrate bearing an inorganic antireflection coating; and
    drying the coated substrate in an environment having a humidity in the range of 15 to 95%.

21. A process for applying an anti-stain, hydrophobic optical coating to a transparent substrate, comprising the steps of:
    preparing a treatment solution consisting essentially of organosilane having a concentration in the range of about 0.1 to 10 mmole per liter, wherein the organosilane is described by the following formula $(RO)_{3-n}-Si-\{(C_{p+q}H_{2p}F_{2q})-(CH_3 \text{ or } -CF_3)\}_{1+n}$ wherein:
    n is 0–3,
    p+q>8, and
    R is $CH_3-$ or $CH_3CH_2-$,
    a first solvent of water, having a weight concentration in the range of about 0.1 to 90%,
    a second solvent selected from the group consisting of ethylene glycol, glycerol, and mixtures thereof, having a weight concentration in the range of about 0.5 to 20%,
    a third solvent selected from the group consisting of ethanol, propanol, butanol, and mixtures thereof, and
    an acidic catalyst;
    applying the treatment solution to a surface of a transparent substrate; and
    drying the coated substrate.

22. A process as defined in claim 21, wherein the organosilane is selected from the group consisting of 1H,1H,2H,2H-perfluorodecyltriethoxysilane, 1H,1H,2H,2H-perfluorodecyltrichlorosilane, octadecyltriethoxysilane, octadecyltrichlorosilane, and mixtures thereof.

23. A process as defined in claim 21, wherein the step of drying the coated substrate comprises:
    initially drying the coated substrate in air for a first time period; and
    subsequently drying the coated substrate for a second time period.

24. A process as defined in claim 23, wherein:
    the step of initially drying the coated substrate has a duration of at least about 20 minutes; and
    the step of subsequently drying the coated substrate has a duration of at least about 20 minutes.

25. A process as defined in claim 23, wherein:
    the step of initially drying the coated substrate occurs at a temperature in the range of about 10 to 40° C.; and
    the step of subsequently drying the coated substrate occurs at a temperature in the range of about 50 to 250° C.

26. A process as defined in claim 23, wherein the step of subsequently drying the coated substrate occurs in an environment having a humidity in the range of 40 to 80%.

27. A transparent substrate carrying a thin-film, anti-stain, hydrophobic, optical coating applied using the process of claim 1.

* * * * *